J. W. JEPSON.
EMERGENCY LIGHTING SYSTEM.
APPLICATION FILED JULY 8, 1914.
1,269,712.
Patented June 18, 1918.
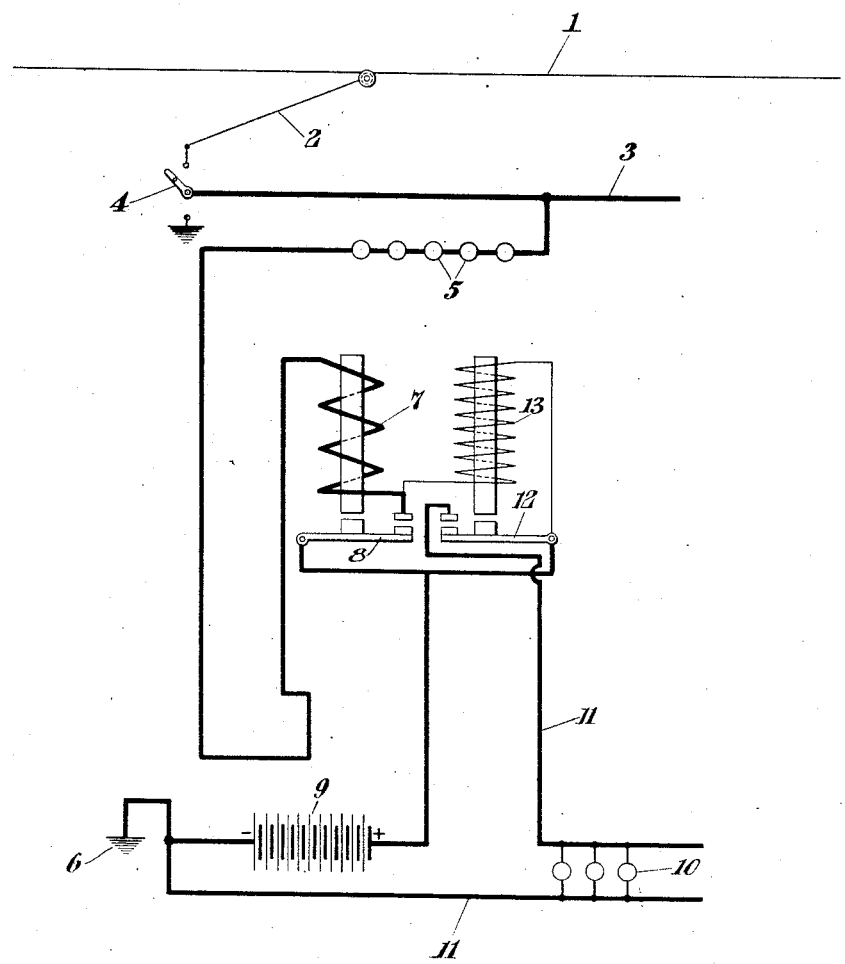

UNITED STATES PATENT OFFICE.

JOHN W. JEPSON, OF DEPEW, NEW YORK, ASSIGNOR TO GOULD COUPLER COMPANY, A CORPORATION OF NEW YORK.

EMERGENCY LIGHTING SYSTEM.

1,269,712.  Specification of Letters Patent.  Patented June 18, 1918.

Application filed July 8, 1914. Serial No. 849,642.

*To all whom it may concern:*

Be it known that I, JOHN W. JEPSON, a citizen of the United States, and a resident of Depew, Erie county, New York, have invented certain new and useful Improvements in Emergency Lighting Systems, of which the following is a specification.

My invention relates to improvements in emergency lighting systems, more especially for electric motive power cars, where the regular lights are supplied with energy from the motive power mains.

One object of my invention is to provide a simple and efficient system in which a storage battery may be charged with energy from the motive power mains and used to supply an auxiliary light circuit upon failure of the motive power mains to supply energy for any reason. Further objects, features and advantages will more clearly appear from the detail description given below, taken in connection with the accompanying drawing, which forms a part of this specification and illustrates diagrammatically a system embodying my invention in one form.

Referring to the drawing, 1 represents one of the motive power mains adapted to supply an electrically propelled car or train as through a trolley 2. 3 represents the light wire for the car or train adapted to be connected to the trolley and main 1 by means of a double throw switch 4. In its other position the switch 4 is adapted to connect the light wire 3 with ground. The ground acts as the return main for the power current and accordingly wherever I use the words "motive power mains" it will be understood that one of them may be ground. The regular lights are shown at 5 connected across the motive power mains, that is, across the main 1 and ground at 6, in series with a coil 7, switch 8 and storage battery 9. The coil 7 is adapted to operate electromagnetically on the switch 8 to close the latter when the coil is energized.

10 represents auxiliary lights connected across an auxiliary light circuit 11, the latter being adapted to be connected across the battery 9 by means of a switch 12 electromagnetically controlled by a high resistance or fine wire coil 13. The coil 13 is connected in series with the low resistance coil 7, but in shunt to the switch 8, so that the switch 8 short circuits the coil 13 when the switch 8 is closed.

In operation, when the switch 4 is closed to the trolley line or main 1, if the mains are energized, current will flow through the regular lights 5, coil 7, coil 13, and through the battery 9, to the ground at 6 or other motive power main. This current will energize both coils 7 and 13 and cause them to close their respective switches 8 and 12. But as soon as switch 8 is closed, it shunts or short circuits coil 13, causing it to immediately release its armature, so that the current flows through the switch 8 to the battery, the current still passing through the coil 7 so that the switch 8 is maintained closed. This current acts to charge the battery and the auxiliary light circuit is disconnected from the battery by the opening of the switch 12.

On failure of the energy supply from the trolley line or motive power mains, the switch 4 is thrown to ground which will allow current to flow from the battery through the coil 13, coil 7, regular lights 5, switch 4 and ground to the opposite side of the battery. This current, however, by reason of the relatively low voltage of the battery and few turns of the coil 7 is insufficient to cause the closing of the switch 8, but by reason of the relatively large number of turns of the coil 13, is sufficient to cause the switch 12 to close so as to connect the auxiliary light circuit 11 directly in circuit with the battery so that the auxiliary lights 10 will be energized from the battery as desired. When the switch 4 is thrown to its neutral position, so as to be disconnected from both the trolley 2 and ground, both coils 7 and 13 will be deënergized, thereby causing both the circuit through the regular lights 5 and the auxiliary light circuit to be opened so that neither set of lights will be lighted.

What I claim as new and desire to secure by Letters Patent of the United States is:—

1. An emergency lighting system for electric motive power cars or the like, having in combination with the motive power mains a storage battery and regular lights connected in series across the motive power mains, a switch in the battery circuit, a coil in series with the battery for controlling the operation of said switch, a coil in shunt to said switch and in series with the first mentioned coil, an auxiliary light circuit, a switch operated by said second coil for connecting the auxiliary light circuit across the battery and a switch for disconnecting the connection between the regular lights and the motive power main and connecting them to the other side of the battery.

2. An emergency lighting system for electric motive power cars or the like, having in combination with the motive power mains a storage battery, a switch for connecting the battery across the motive power mains to be charged therefrom, a coil in series with the battery for controlling the operation of said switch, an auxiliary light circuit, a switch for connecting the auxiliary light circuit in circuit with the battery, a coil for operating the latter switch, and means for connecting said last mentioned coil in circuit with the battery.

3. An emergency lighting system for electric motive power cars or the like, having in combination with the motive power mains a storage battery, a switch for connecting the battery across the motive power mains to be charged therefrom, a coil in series with the battery for controlling the operation of said switch, an auxiliary light circuit, a switch for connecting the auxiliary light circuit in circuit with the battery, a coil for operating the latter switch, and means for connecting said last mentioned coil in circuit with the battery, said two coils being serially connected with one another.

4. An emergency lighting system for electric motive power cars or the like, having in combination with the motive power mains a storage battery, a switch for connecting the battery across the motive power mains to be charged therefrom, a coil in series with the battery for controlling the operation of said switch, an auxiliary light circuit, a switch for connecting the auxiliary light circuit in circuit with the battery, a coil for operating the latter switch, and means for connecting said last mentioned coil in circuit with the battery, and connections whereby the closing of said first switch acts to shunt said second mentioned coil.

5. An emergency lighting system for electric motive power cars or the like, having in combination with the motive power mains a storage battery, a switch for connecting the battery across the motive power mains to be charged therefrom, a coil in series with the battery for controlling the operation of said switch, an auxiliary light circuit, a switch for connecting the auxiliary light circuit across the battery, a coil for operating the latter switch, and means for connecting said last mentioned coil across the battery, and connections whereby the closing of said first switch acts to shunt said second mentioned coil, said two coils being serially connected with one another.

6. An emergency lighting system for electric motive power cars or the like, having in combination with the motive power mains a storage battery, a switch for connecting the battery across the mains to be charged therefrom, a coil in series with the battery for controlling the operation of said switch, a relatively high resistance connected in shunt to said switch, an auxiliary light circuit, and automatic means whereby the auxiliary light circuit may be connected in circuit with the battery.

7. An emergency lighting system for electric motive power cars or the like, having in combination with the motive power mains a storage battery, regular lights supplied from the motive power mains, a switch for connecting the battery across the mains to be charged therefrom, a coil in series with the battery for controlling the operation of said switch, a relatively high resistance connected in shunt to said switch, an auxiliary light circuit, and means whereby the auxiliary light circuit may be connected in circuit with the battery, said last mentioned automatic means embracing a double throw switch for connecting the regular lights either with one of the motive power mains or with ground.

8. An emergency lighting system for electric motive power cars or the like, having in combination with the motive power mains a storage battery, a switch for connecting the battery across the mains to be charged therefrom, a coil in series with the battery for controlling the operation of said switch and adapted when energized to hold the switch closed, a relatively high resistance connected in shunt to said switch, and adapted to be substantially shortcircuited by said switch when the latter is closed, an auxiliary light circuit, and means whereby the auxiliary light circuit may be connected across the battery.

In testimony whereof, I have signed my name to this specification, in the presence of two subscribing witnesses.

JOHN W. JEPSON.

Witnesses:
P. W. ENGLISH,
JOS. MURPHY.

It is hereby certified that in Letters Patent No. 1,269,712, granted June 18, 1918, upon the application of John W. Jepson, of Depew, New York, for an improvement in "Emergency Lighting Systems," errors appear in the printed specification requiring correction as follows: Page 2, line 91, claim 7, strike out the word "automatic"; same page, line 107, claim 8, before the word "means" insert the word *automatic*; and that the said Letters Patent should be read with these corrections therein that the same may conform to the record of the case in the Patent Office.

Signed and sealed this 23d day of July, A. D., 1918.

[SEAL.]

R. F. WHITEHEAD,

*Acting Commissioner of Patents.*

Cl. 171-313